(12) United States Patent
Cursetjee et al.

(10) Patent No.: US 7,918,911 B2
(45) Date of Patent: Apr. 5, 2011

(54) PERIMETER SEAL FOR PASSAGEWAYS BETWEEN ADJACENT AIR-HANDLING PLENUMS

(75) Inventors: Zareer Cursetjee, Clackamas, OR (US); David Baugh, Newberg, OR (US)

(73) Assignee: Cleanpak International, Clackamus, OR (US)

( * ) Notice: Subject to any disclaimer, the term of this patent is extended or adjusted under 35 U.S.C. 154(b) by 914 days.

(21) Appl. No.: 11/888,956

(22) Filed: Aug. 3, 2007

(65) Prior Publication Data

US 2009/0033038 A1     Feb. 5, 2009

(51) Int. Cl.
    *B01D 46/00*        (2006.01)

(52) U.S. Cl. .............................. 55/385.2; 55/502; 55/483

(58) Field of Classification Search ..................... 55/355, 55/385.2, 483, 502; 52/484, 486, 488, 506.08, 52/775, 786.13, 506.06, 764; 454/187
See application file for complete search history.

(56) References Cited

U.S. PATENT DOCUMENTS

| | | | | |
|---|---|---|---|---|
| 4,683,699 A | * | 8/1987 | Larsson | 52/775 |
| 4,946,484 A | * | 8/1990 | Monson et al. | 55/385.2 |
| 4,986,050 A | * | 1/1991 | Brunetti et al. | 52/506.08 |
| 5,279,632 A | * | 1/1994 | Decker et al. | 55/355 |
| 5,540,028 A | * | 7/1996 | Scott et al. | 52/506.08 |
| 5,617,699 A | * | 4/1997 | Thompson, Jr. | 52/786.13 |
| 5,865,674 A | * | 2/1999 | Starr | 454/187 |
| 6,117,202 A | * | 9/2000 | Wetzel | 55/385.2 |

* cited by examiner

*Primary Examiner* — Duane Smith
*Assistant Examiner* — Minh-Chau Pham
(74) *Attorney, Agent, or Firm* — The Small Patent Law Group; Dean Small; Michael J. A. Lainauer

(57) ABSTRACT

A seal around the perimeter of an air passageway which passes between adjacent plenums in an air-handling system includes a first channel containing a sealant which is located in the first plenum and extends around the periphery of the passageway. The first channel partially overlies the sidewall of the plenum and partially extends past the exposed edge of the plenum walls. A second channel, which is similarly located in the second plenum, also contains a sealant. A first blade projects from the wall of the first plenum into the sealant in the first channel, and a second blade projects from the wall of the second plenum into the sealant in the second channel. A third blade, which extends into the sealant in both the first and second channels, is located inwardly of the edges of the channel walls that form the perimeter of the passageway.

20 Claims, 4 Drawing Sheets

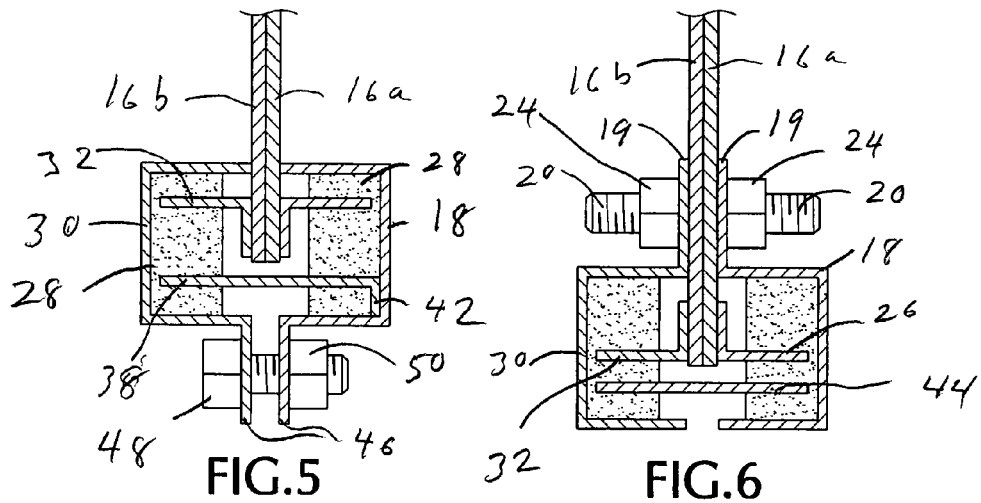
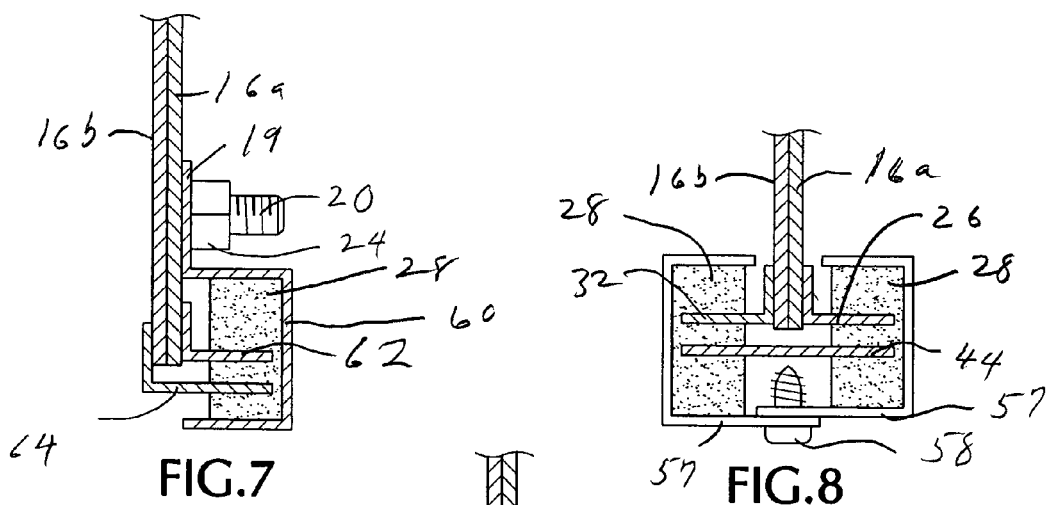
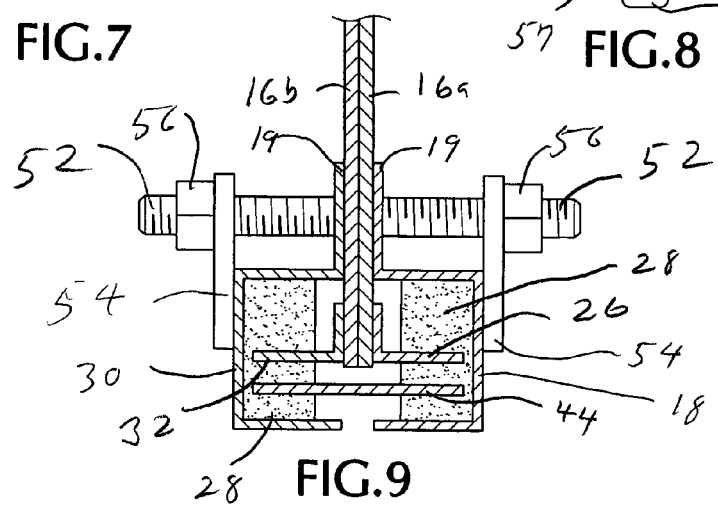

PERIMETER SEAL FOR PASSAGEWAYS BETWEEN ADJACENT AIR-HANDLING PLENUMS

BACKGROUND OF THE INVENTION

This invention relates to air-handling systems and in particular to sealing air-handling systems to prevent air from inadvertently escaping from them.

There are many spaces, such as hospitals and manufacturing clean rooms, where air entering the space must be strictly controlled to prevent contaminants from entering the space. This is accomplished by circulating the air in the space through air-handling systems having filters through which all of the air entering the space must pass. A common problem with these air handling systems is leakage of unfiltered air into the space at the intersection of components of the air-handling system. Hopkins, et al., U.S. Pat. No. 6,351,920 describes an apparatus for providing a seal around the perimeter of ceiling mounted modules to prevent air from bypassing the modules. This is accomplished by inserting blades which project from the periphery of the module into a sealant in troughs located in the ceiling grid elements.

In air-handling systems of this type air often is distributed through sheet metal plenums and in some applications air must be shared between side-by-side plenums. This is accomplished by forming an air passageway in the adjacent walls of the plenums. Heretofore these passageways have been sealed to prevent air from escaping between the plenums by placing a flexible U-shaped trim piece over the exposed ends of the plenum walls around the periphery of the passageway and placing a caulking compound around the perimeter of the trim piece, or by placing a caulking compound directly over the exposed ends of the plenum walls. This procedure is labor intensive and if the caulk is not applied correctly, leaks can occur.

BRIEF SUMMARY OF THE INVENTION

The subject invention overcomes the foregoing shortcomings of the prior art systems for sealing around the periphery of passageways between adjacent air-handling ducts by placing a first channel, containing a sealant, in one of the plenums around the periphery of the passageway, such that the channel partially overlies the plenum wall and partially extends past the edges of the plenum walls into the passageway. A second channel, containing a sealant, is placed in the other plenum around the periphery of the passageway, such that it also partially overlies the plenum wall and partially extends past the edge of the plenum walls into the passageway.

A first blade extends from the wall of the first plenum into the sealant in the first channel and a second blade extends from the wall of the second plenum into the sealant in the second channel. A third blade extends into the sealant in both of the channels and extends across the edges of the plenum walls.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 4-10 are cross-sectional views, similar to FIG. 3B, showing alternative embodiments of the invention.

DETAILED DESCRIPTION OF PREFERRED EMBODIMENT

Figure 1:
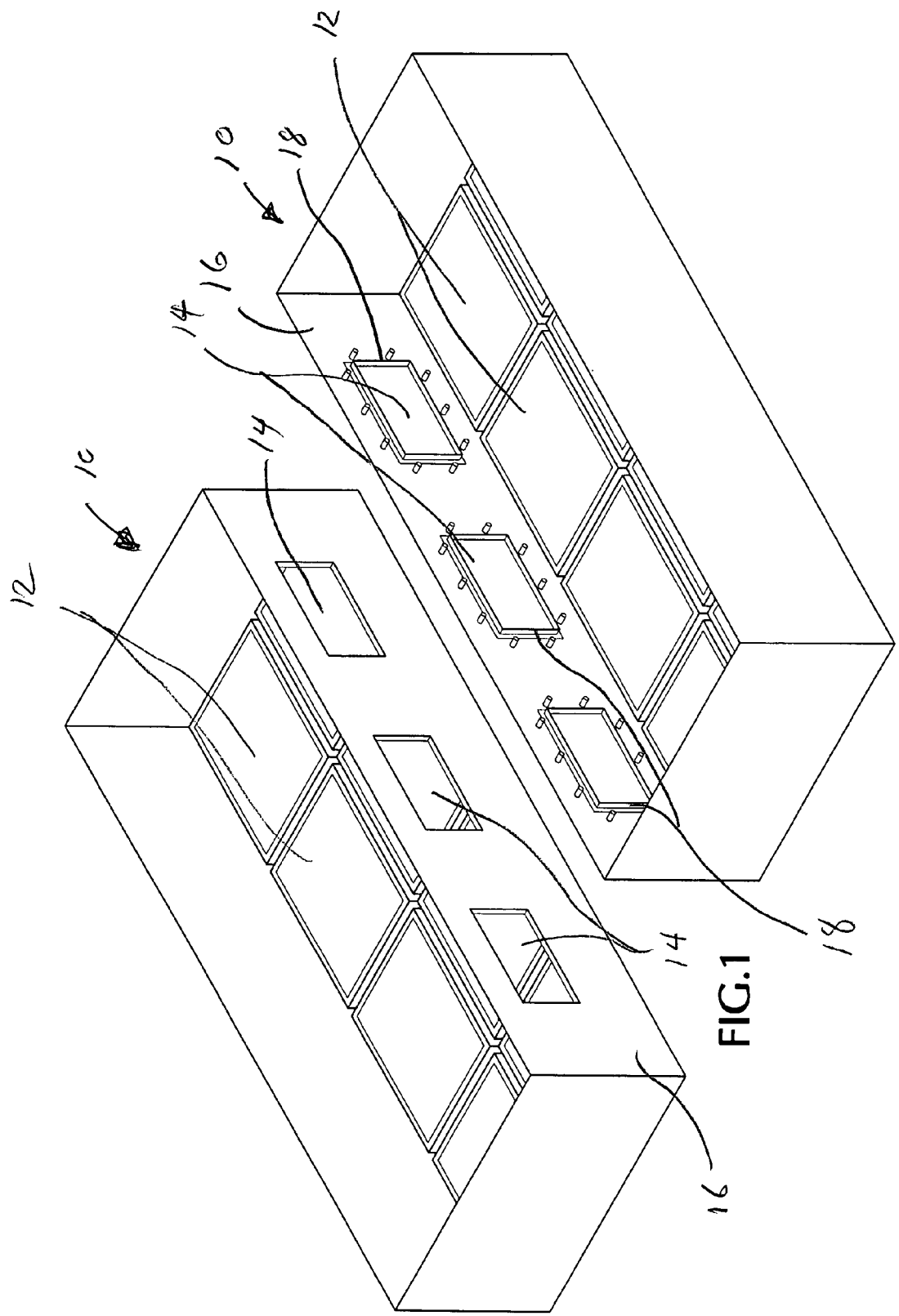
FIG. 1 is an exploded perspective view showing two side-by-side plenums with the seal of the subject invention partially installed.

Referring now to FIG. 1 of the drawings, air-handling systems for spaces that need a strictly controlled environment, such as hospitals and manufacturing clean rooms, typically have multiple filters mounted in an array on a suspended ceiling grid. In order to reduce the expense of installing multiple air sources on site, it is common to build rectangular sheet metal plenums 10 which feed air to the filters. It often is desired to share air between side-by-side plenums through passageways 14 located in the plenum walls 16. While the walls of adjacent plenums generally touch one another, air flowing through the passageway will escape between the walls unless the exposed edges 17 of the walls which face inwardly into the passageway are sealed.

Figure 2:
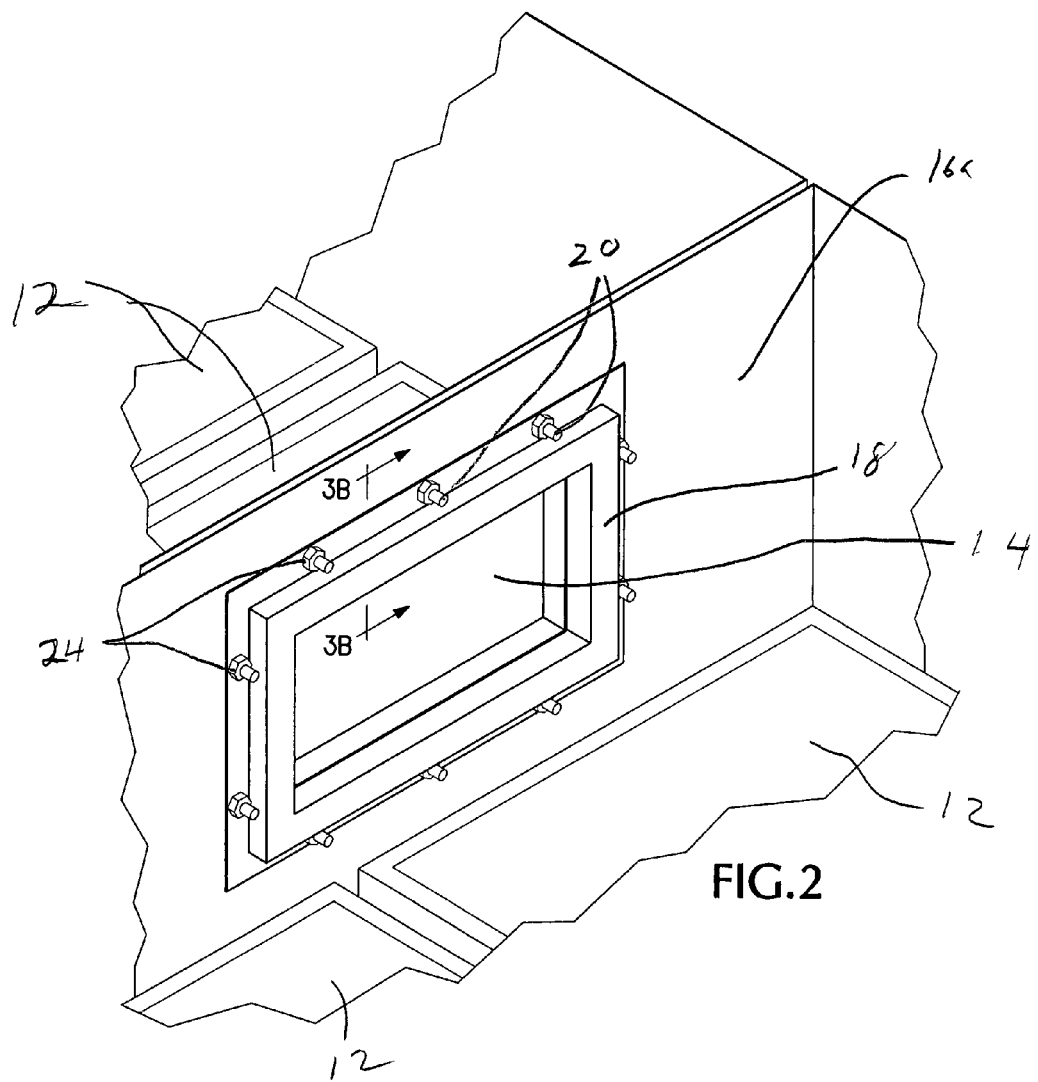
FIG. 2 is a detail perspective view, at an enlarged scale, showing the 15 seal installed in a plenum.
Figure 3A:
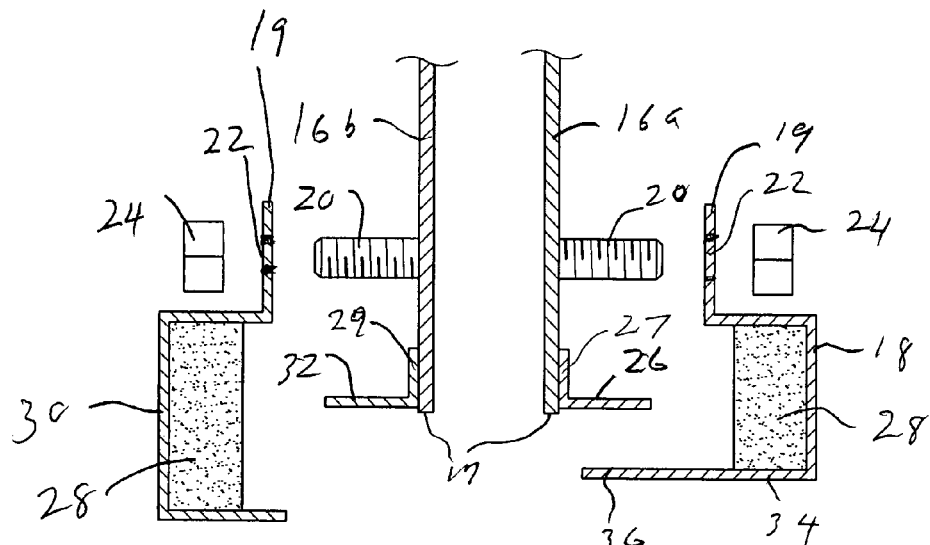
FIG. 3A is an exploded view showing the details of the seal.
Figure 3B:
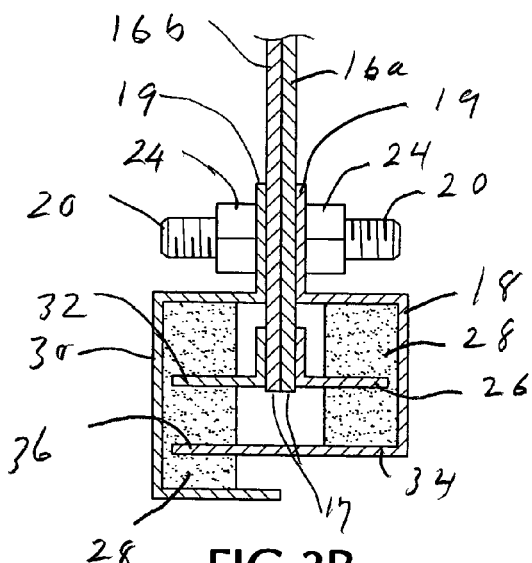
FIG. 3B is a sectional view taken along the line 3B-3B of FIG. 2.
Figure 4:
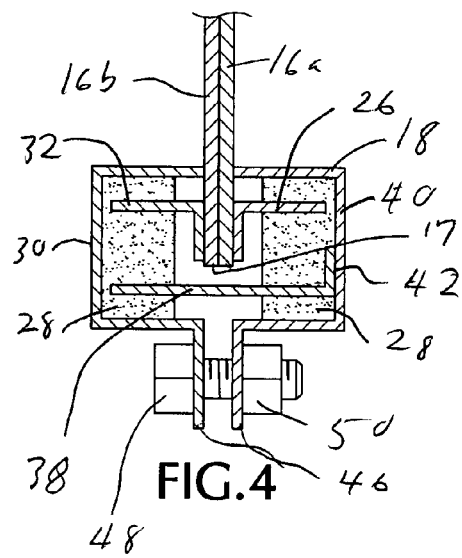

Referring now also to FIGS. 2 and 3A, this seal is provided by placing a first channel 18 on the abutting wall 16a of a first plenum. In the embodiment illustrated in FIGS. 3A and 3B the first channel is attached to the wall 16a by attaching studs 20 at spaced intervals along the wall 16a. The studs 20 pass through holes 22 in an attachment leg 19 of the first channel. By tightening nuts 24 on the studs the first channel is pulled against the wall. The first channel extends around the entire periphery of the passageway 14. A portion of the first channel faces towards and overlaps the wall 16a and a portion extends past the exposed edges 17 of the walls and faces into the passageway 14.

A first blade 26, which projects from the wall 16a inwardly of the passageway 14, extends into sealant 28 located in the first channel. The first blade 26 also extends around the entire periphery of the passageway 14. The first blade 26 is attached to the wall 16a in a way that air cannot pass between the blade and the wall. In the embodiment illustrated, the first blade 26 is L-shaped and has a leg 27 which is welded to the first wall. The first blade could be attached to the wall 16a, in many other ways, however, and could have other shapes, so long as air cannot pass between the blade and the wall.

A second channel 30, which is shown in the drawings as a mirror image of the first channel 18, is placed on the abutting wall 16b of a second plenum which is fluidly connected to the first plenum through the passageway 14. In the embodiment illustrated, the second channel is attached to the wall 16b by attaching studs 20 at spaced intervals along the wall 16b. The studs pass through holes 22 in an attachment leg 19 of the second channel. Tightening nuts 24 on the studs pulls the second channel to the wall. The second channel extends around the entire periphery of the passageway 14. A portion of the second channel faces towards and overlaps the wall 16b and a portion extends past the exposed edges 17 of the walls and faces into the passageway 14.

A second blade 32, which projects outwardly from the second wall 16b inwardly of the passageway 14, extends into sealant 28 located in the second channel. The second blade 32 also extends around the entire periphery of the passageway 14. The second blade 32 is attached to the second plenum wall 16b in a way that air cannot pass between the blade and the wall. In the embodiment illustrated the first blade is L-shaped and has a leg 29 which is welded to the second wall. The second blade 32 also could be attached to the second wall 16b in other ways, and could have other shapes, so long as air cannot pass between the blade and the wall.

In the embodiment illustrated, in FIG. 3A, the first channel 18 is slightly shorter than the second channel 30 and one side 34 of the first channel 18 is longer than the other side and creates a third blade 36 which passes below the exposed edges 17 of the plenum wall, and extends into the sealant in the second channel. Thus, the third blade extends into the sealant 28 in both the first and second channels.

The sealant 28 is placed in the first and second channels 18, 30 before they are attached to the wall 16a, 16b. When attached the first, second and third blades 26, 32, 36 extend into the sealant, FIG. 3B. The sealant then flows around the blades to create an air-tight seal which can withstand the constant vibration existing in devices of this type.

Figure 10:
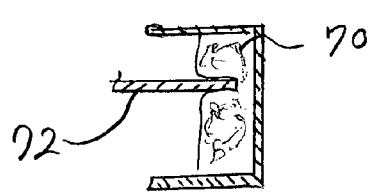

In the embodiments illustrated in FIGS. 3A-9 the sealant is a gel. However, other types of sealants would work and the sealant could even by a soft deformable gasket 70 which would flow around the blade 72 once it is inserted into the channels, FIG. 10.

The first and second blades prevent air passing through the plenums from going between the attachment leg 19 of the associated channel and passing between the exposed edges 17 of the walls 16a and 16b. The third blade 36 prevents air passing through the passageway 14 from passing between the exposed edges 17 of the walls 16a and 16b. As a result it is not necessary to seal between the channels 18, 30 and the plenum walls.

Rather than being an extension of the first channel wall, the third blade 38 can be attached to the back 40 of the first channel 18. In the embodiment shown in FIGS. 4 and 5, the third blade is L-shaped and has a leg 42 which is welded to the first channel wall.

In yet another embodiment, shown in FIGS. 6, 8 and 9, the third blade 44 is not attached to the channels at all. Instead, one end extends into the sealant in the first channel 18 and the other end extends into the sealant in the second channel 30.

Rather than attaching the first and second channels directly to the plenum walls 16a, 16b, they can be attached to one another. In the embodiment illustrated in FIGS. 4 and 5, the first and second channels 18, 30 have tabs 46 which project into the passageway 14. Bolts 48 extend through aligned holes (not shown) located at spaced intervals along the tabs and when nuts 50 are tightened on the bolts the top edges of the channels 18, 30 are clamped against the plenum walls 16a, 16b.

In the embodiment shown in FIG. 9, studs 52 project out from the attachment legs 19 of the first and second channels at spaced intervals. Bars 54, having holes (not shown) which are aligned with the studs 52, extend over the sides of the first and second channels 16a, 16b. When bolts 56 are tightened on the studs 52, the bars 54 clamp the top edges of the first and second channels against the plenum walls 16a, 16b.

In another embodiment, as shown in FIG. 8, the inner legs 57 of the first and second channels overlap one another and a screw 58 is placed through the overlapping portion of the legs. In this embodiment, the first and second channels are not attached to the plenum walls 16a, 16b but are held in place primarily by the interaction of the first and second blades 26, 32 with the sealant.

In a final embodiment, shown in FIG. 7, a single channel 60, which is similar to the first channel used in the embodiment shown in FIG. 6, is attached to the first plenum wall 16a by a stud 20 and nut 24. In this embodiment a first blade 62 is attached to the first plenum wall 16a and extends into the sealant 28 in the channel 60 like in the previous embodiments. The second blade 64, which is attached to the second plenum wall 16b, passes inwardly across the exposed ends 17 of the plenum sidewalls and also extends into the sealant 28 in the channel 60. While this embodiment is much simpler, because the second blade 64 is permanently attached to the second wall 16b and extends outwardly from the wall, it makes installing the plenums more difficult.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An air seal around a passageway between abutting walls in adjacent plenums, where the passageway is defined by inwardly facing edges of the abutting walls, said seal comprising:
   a first channel, containing a sealant, located in a first one of said plenums and extending around the periphery of said passageway, said first channel partially overlapping the wall of said first plenum and partially extending past the inwardly facing edges of said walls into said passageway;
   a second channel, containing a sealant, located in a second one of said plenums and extending around the periphery of said passageway, said second channel partially overlapping the wall of said second plenum and partially extending past the inwardly facing edges of said walls into said passageway;
   a first blade projecting from the wall of said first plenum into the sealant in said first channel;
   a second blade projecting from the wall of said first plenum into the sealant in said second channel; and
   a third blade which extends into the sealant in both said first and second channels and extends across the inwardly facing edges of said walls.

2. The seal of claim 1 wherein said first channel is attached to the wall of said first plenum and said second channel is attached to the wall of said second plenum.

3. The seal of claim 1 wherein said first channel is attached to said second channel.

4. The seal of claim 1 wherein said third blade is an integral part of said first channel.

5. The seal of claim 4 wherein said first channel has paired spaced-apart sidewalls and said third blade is one of said sidewalls.

6. The seal of claim 4 wherein said first channel has an end wall and said third blade is attached to said end wall.

7. The seal of claim 1 wherein said third blade is not attached to either of said channels.

8. The seal of claim 1 wherein said first blade is attached to the wall of said first channel and said second blade is attached to the wall of said second channel, such that air cannot pass between either blade and its respective wall.

9. The seal of claim 8 wherein said first and second blades are welded to the respective plenum walls.

10. The seal of claim 2 wherein said first channel is bolted to the wall of said first plenum and said second channel is bolted to the wall of said second plenum.

11. The seal of claim 2 wherein said first and second channels are clamped against the respective plenum walls.

12. The seal of claim 1 wherein said sealant is a gel.

13. The seal of claim 1 wherein said sealant is a gasket.

14. The seal of claim 1, wherein said first channel includes an opening and said second channel includes an opening, the opening of said first channel facing the opening of said second channel.

15. An air handler comprising:
- a first plenum having a first wall including an inwardly facing edge;
- a second plenum having a second wall including an inwardly facing edge, the second wall abutting the first wall of the first plenum;
- a passageway defined by the inwardly facing edge of first wall and the inwardly facing edge of the second wall; and
- an air seal for sealing the passageway, the air seal including a channel partially overlapping the first wall and partially extending past the inwardly facing edge of the first wall, the channel having a sealant therein, a blade extending from the first wall into the sealant.

16. The air handler of claim 15, wherein the channel includes an opening that faces the first wall.

17. The air handler of claim 15, wherein the channel is a first channel, the air handling plenum further comprising a second channel partially overlapping the second wall and partially extending past the inwardly facing edge of the second wall.

18. The air handler of claim 17, wherein the first channel includes an opening and the second channel includes an opening, the opening of the first channel facing the opening of the second channel.

19. A method of sealing abutting walls, the method comprising:
- partially overlapping a first of the abutting walls with a first channel that partially extends past an inwardly facing edge of the first wall;
- partially overlapping a second of the abutting walls with a second channel that partially extends past an inwardly facing edge of the second wall;
- extending a first blade from the first wall and into the first channel; and
- extending a second blade from the second wall and into the second channel.

20. The method of claim 19, wherein the first channel includes an opening and the second channel includes an opening, the method further comprising facing the opening of the first channel toward the opening of the second channel.

* * * * *